United States Patent [19]

Revells

[11] 4,167,997
[45] Sep. 18, 1979

[54] CONVEYOR ROLL CONSTRUCTION

[75] Inventor: Robert G. Revells, Toledo, Ohio

[73] Assignee: Libbey-Owens-Ford Company, Toledo, Ohio

[21] Appl. No.: 886,738

[22] Filed: Mar. 15, 1978

[51] Int. Cl.² .................... B65G 13/06; B65G 13/02
[52] U.S. Cl. .................... 198/789; 65/275; 65/273; 198/780
[58] Field of Search .............. 198/789, 780; 65/273, 65/275; 64/2 R, 23; 403/361, 359

[56] References Cited

U.S. PATENT DOCUMENTS

| | | | |
|---|---|---|---|
| 3,485,615 | 12/1969 | Rahrig | 65/275 |
| 3,610,406 | 10/1971 | Fleischauer | 198/789 |
| 3,779,037 | 12/1973 | Petros | 403/359 |
| 3,853,214 | 12/1974 | Jinarcsik | 198/780 |
| 3,867,748 | 2/1975 | Miller | 29/115 |
| 3,905,794 | 9/1975 | Revells | 65/106 |
| 4,015,968 | 4/1977 | Revells | 65/289 |
| 4,034,837 | 7/1977 | Jinarcsik | 198/780 |

Primary Examiner—Robert B. Reeves
Assistant Examiner—Brian M. Bond
Attorney, Agent, or Firm—Collins, Oberlin & Darr

[57] ABSTRACT

A quick connect-disconnect coupling assembly detachably connecting the inner core member of a composite type conveyor roll to its mounting. The coupling assembly includes a tubular drive extension, a first coupling section rigidly secured to the core member and a second coupling section mounted within the drive extension.

7 Claims, 6 Drawing Figures

CONVEYOR ROLL CONSTRUCTION

BACKGROUND OF THE INVENTION

The present invention relates generally to conveyor rolls and, more particularly, to a new and useful coupling for a conveyor roll.

In one known commercial production of curved or bent glass sheets in large quantities, such as is encountered in the mass production of glazing closures for automobiles and the like, the sheets are supported in a horizontal plane and advanced in a horizontal path on externally driven roll-type conveyors successively through a heating area, a bending area and a heat treating area for annealing or tempering the bent sheets. The heated glass sheets are advanced from the heating furnace into the bending area and accurately located therein between complemental upper and lower shaping members by the engagement of the leading edges thereof with locating stops positioned in the path of movement of the advancing sheets. When properly oriented, the sheet is engaged along its marginal edge portions by the lower press member and lifted from the conveyor rolls for pressing between the complemental shaping surfaces of the press members into the desired curvature.

It has been found desirable to employ in the bending area a series of conveyor rolls having arcuately shaped central portions which normally are disposed in an upper common horizontal plane for supporting a flat sheet of heat-softened glass prior to bending and which are pivotable into a lower position at angular attitudes or planes relative to the common horizontal plane out of engagement with said flat sheet upon engagement thereof along its marginal edge portion by the shaping rail of the upwardly movable lower press member. In their lower attitudes, these rolls conjointly define a curved surface complementary to the curvature imparted to the sheet for receiving the same after bending and which serve to preserve such curvature as the bent sheet is advanced out of the bending area. These rolls, which are of a two-piece construction comprised of a fixed inner core and a rotatable outer sleeve, are disclosed in detail and claimed in U.S. Pat. No. 3,905,794, granted Sept. 16, 1975, and assigned to the same assignee as the present invention.

In the usual roll construction of the above type, the fixed inner core of the roll is attached at one end thereof to a stub shaft extending through axially spaced bushings mounted in a rotatable drive member which is connected to the rotatable sleeve of the roll. During removal and replacement of the curved inner core from and into the outer sleeve, which is required in the bending area each time a production run of differently configurated sheets is contemplated, problems were encountered in properly withdrawing and then inserting the associated stub shaft from and through the bushings without damaging the latter. Moreover, even slight wear of these bushings caused erratic and unbalanced rotation of the associated rolls.

SUMMARY OF THE INVENTION

Accordingly, it is a primary object of the present invention to overcome the above shortcomings of the prior art by providing a new and useful coupling assembly facilitating rapid and easy conveyor roll core removal and replacement without disturbing other components associated with the roll.

It is a further object of this invention to provide a new and useful quick connect-disconnect coupling assembly for expediting roll core removal and/or replacement.

These and other objects, advantages, and characterizing features of the present invention will become clearly apparent from the ensuing detailed description of an illustrative embodiment thereof, taken together with the accompanying drawings, wherein like reference numerals denote like parts throughout the various views.

DESCRIPTION OF THE PREFERRED EMBODIMENT

Figure 1:
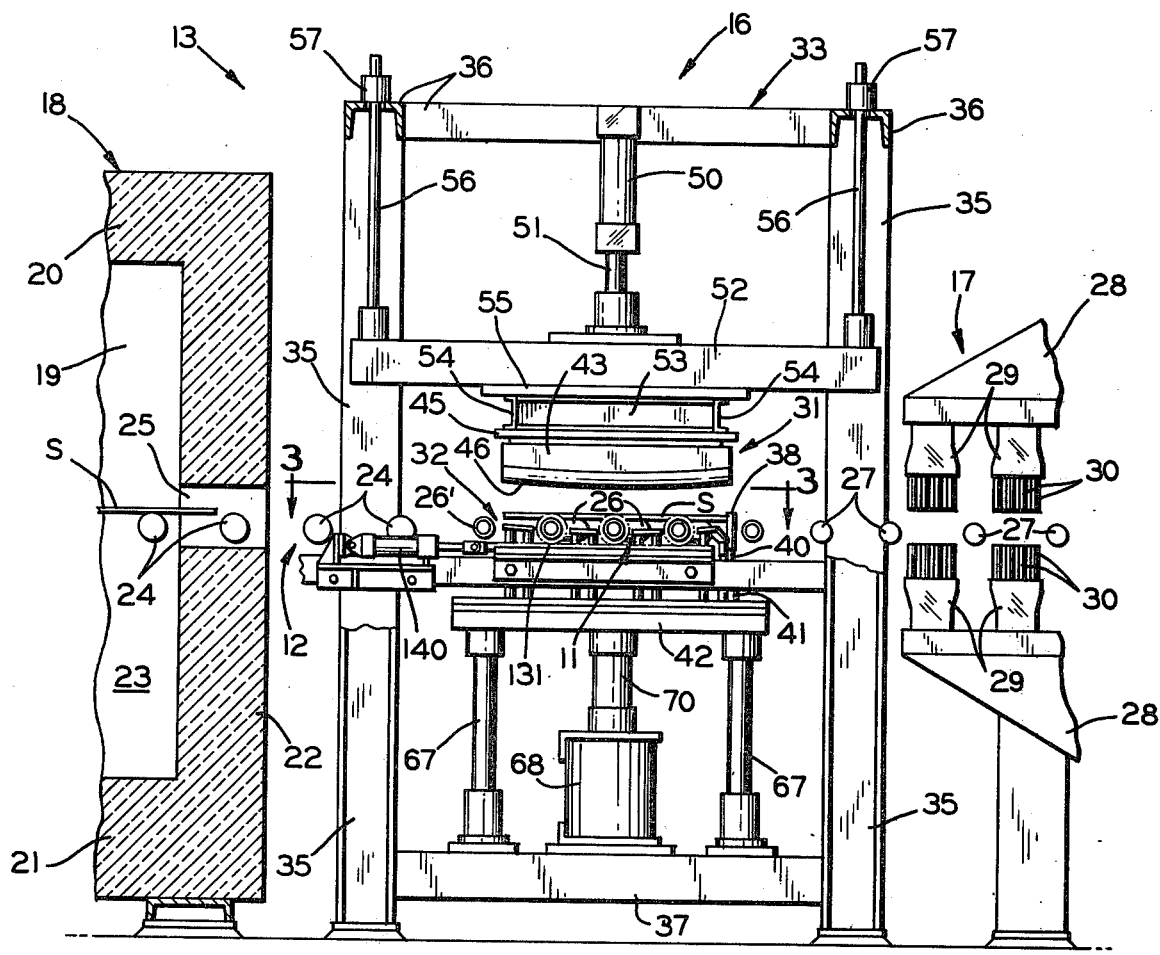
FIG. 1 is a side elevational view of a bending apparatus interposed between a glass heating and tempering section and provided with a conveyor roll system incorporating the novel features of the present invention.

Referring now in detail to the illustrative embodiment depicted in the accompanying drawings, there is shown in FIG. 1 a glass sheet supporting and conveying apparatus, generally designated 11, embodying the novel features of this invention and forming a part of a continuous conveyor system, comprehensively designated 12. The conveyor system 12 forms a component part of a bending and tempering apparatus, generally designated 13, particularly adapted for use in the production of bent, tempered glass sheets by a continuous process in which the sheets to be treated are supported and moved successively along a predetermined horizontal path on conveyor system 12 through a heating section 15, a bending section 16, and a tempering section 17, the sections being contiguous so that a sheet passes immediately from one section to the next succeeding section.

In the illustrative embodiment, the heating section 15 comprises a tunnel-type furnace 18 having a heating chamber 19 defined by a top wall 20, a bottom wall 21, a forward end wall (not shown), a rear end wall 22 and opposite side walls 23, all formed of a suitable refractory material. This chamber 19 can be heated in any desired manner by suitable heating means, such as gas fired burners or electrical resistance elements for example (not shown), located in the top and side walls of the furnace 18. The sheets S are advanced through the heating chamber 19 on a series of conveyor rolls 24, which form a part of the conveyor system 12, and extend from the entrance end (not shown) of the furnace 18, through the oppositely disposed exit end and toward the bending section 16. The sheets S are heated to substantially the softening point of the glass during their passage through the chamber 19 and, upon emerging from an opening 25 in the rear end wall 22 of furnace 18, are received on a second series of conveyor rolls 26 and 26', which form a part of the supporting and conveying apparatus 11 and move the sheets within the bending section 16 between a pair of press members, hereinafter more fully described, for imparting the desired curvature to the sheets S.

After bending, the sheets S are advanced along the path and are transferred from the conveyor rolls 26 and 26' onto a third set of conveyor rolls 27, forming a part of the conveyor system 12, and which move the bent sheets S to and through the tempering section 17 wherein their temperature is rapidly reduced to produce the proper temper in the glass. In the embodiment illustrated in FIG. 1, the tempering section 17 includes a chilling means comprising upper and lower blastheads 28 disposed above and below the path of movement of the glass sheets, each being provided with a plurality of manifold sections 29 having a series of tubes 30, respectively, operable to direct opposed streams of cooling fluid, such as air or the like, toward and against the opposite surfaces of the sheets S moving along such path.

The bending apparatus within section 16 comprises an upper male press member 31 and a lower female press member 32 having opposed complemental shaping surfaces conforming to the desired curvature of the sheet to be bent. The press members 31 and 32 are mounted for relative movement toward and away from each other on the structural frame 33, which includes a framework of vertically disposed columns 35 and horizontally extending beams 36 interconnected and tied together to form a rigid, box-like structure. A base member 37 extends between the upright columns 35 for supporting the female press member 32 and associated parts. The male press member 31 is mounted above the conveyor rolls 26 for vertical reciprocal movement relative to frame 33 while the female press member 32 is located below the conveyor rolls 26 and mounted for vertical reciprocal movement toward and away from the male press member 31.

A pair of laterally spaced locator stops 38 are positioned in the path of movement of the advancing glass sheets S to accurately position the same in the desired location relative to the press members 31 and 32. Each stop 38 is secured to the distal end of a piston rod 40 of a fluid actuating cylinder 41 mounted on a carriage 42. The cylinders 41 are operative to raise and lower the stops 38 between an upper position above conveyor rolls 26 in the path of movement of the glass sheet S and a lower position therebeneath.

In the illustrative embodiment shown in the drawings, the male press member 31 comprises a substantially solid body 43 formed of any suitable refractory material capable of withstanding the elevated temperatures to which the mold is subjected. The mold body 43 is suitably mounted on a base plate 45 and is provided with a downwardly directed, generally convex shaping surface 46 to impart the desired curvature to the sheet. However, the specific curvature of the shaping surface 46 is dictated by the desired shape of the glass sheet being bent and can vary widely, as desired. Also, a conventional male press member of outline or ring-type construction having a shaping rail may be used in lieu of the solid-line press member 31, if desired.

The means for supporting the male press member 31 on frame 33 include at least one actuating cylinder 50 (FIG. 1) mounted on one of the upper horizontal beams 36 and having a suitable reciprocable piston (not shown) provided with a piston rod 51 connected at its outer end to a vertically reciprocal platen frame 52. The base member 45 of the male press member 31 is connected to the platen frame 52 for movement therewith by means of interconnected structural members 53 and 54 and a support plate 55 extending transversely of the platen frame 52. A plurality of guideposts 56 are connected at their lower ends to the four corners of platen frame 52, respectively, and extend upwardly through suitable bushings 57 mounted on upper horizontal beams 36 for sliding movement relative thereto to properly guide platen frame 52 during its vertical reciprocal movement.

Figure 2:
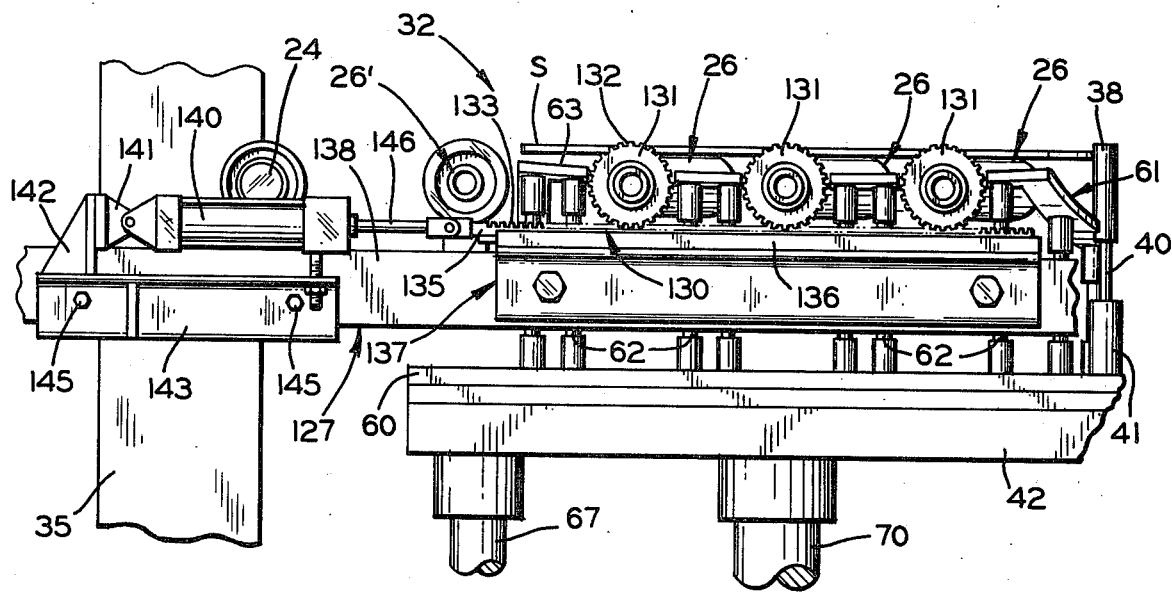
FIG. 2 is an enlarged side elevational view of the roll conveyor system in FIG. 1.

The female press member 32 is of outline or ring-type construction and comprises a base member 60 secured to the carriage 42 and a shaping rail 61 connected to the base member 60 in spaced relation thereto by means of a series of connecting rods 62 (FIG. 2). The shaping rail 61 conforms in outline to the glass sheet S to be bent and is provided on its upper face with a generally concave shaping surface 63 complementary to the male press member shaping surface 46 in opposed relation thereto. To permit displacement of the female shaping rail 61 above the level of the conveyor rolls 26 for lifting the sheets thereabove into pressing engagement with the male shaping surface 46, the female shaping rail 61 is formed of a plurality of segments (FIG. 3) including end bars 65 extending generally in the direction of or parallel to rolls 26 and side bars 66 extending generally transversely of the conveyor rolls 26 and spaced apart from each other a sufficient distance to pass between adjacent rolls 26.

Carriage 42 is supported by a pair of guide members 67 and vertically movable by a fluid actuator 68 mounted on base member 37 and having a suitable piston rod 70 for raising and lowering the female press member 32 between its lower position beneath conveyor rolls 26 and its upper position thereabove for lifting a heated glass sheet S from the conveyor rolls 26 and pressing the same against the male press member 31 between the complemental shaping surfaces 46 and 63, thus forming the glass sheet into the desired curvature. After bending, piston rod 70 is retracted to lower the female press member 32 below conveyor rolls 26, depositing the bent sheet thereon for advancement into the tempering section.

Figure 3:
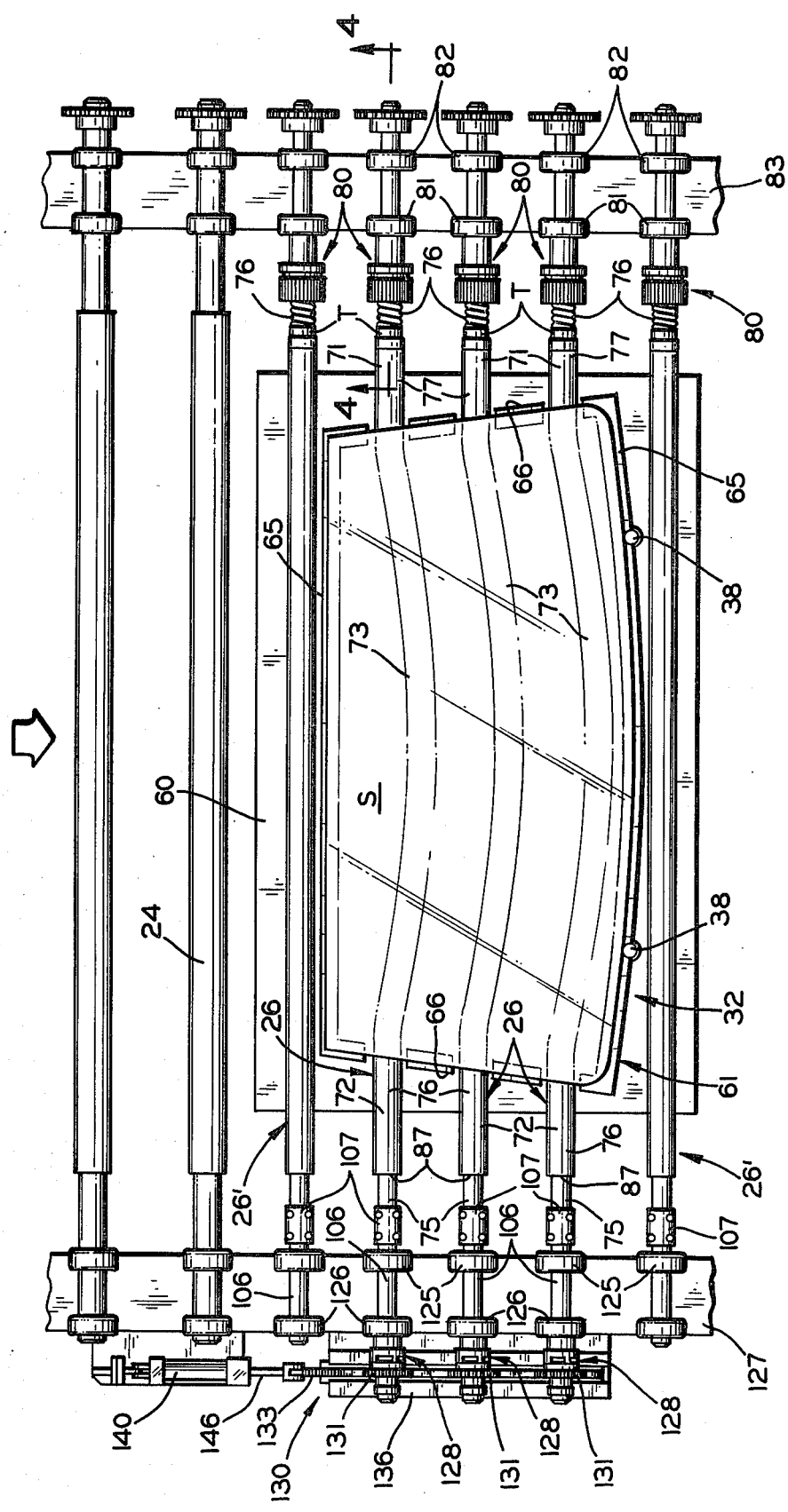
FIG. 3 is a partial top plan view, on an enlarged scale, looking in the direction of arrows 3—3 of FIG. 1, and showing the conveyor rolls in relation to the lower press member.

As best shown in FIG. 3, each of the conveyor rolls 26, which are located within the area defined by the shaping rail 61, comprises straight opposite end portions 71 and 72 having a common axis and a central, arcuately curved portion 73 joining the two straight end portions 71 and 72. The two outer conveyor rolls 26' located in the bending section but outwardly of the area defined by shaping rail 61 differ from rolls 26 in that they are straight throughout their entire lengths rather than having central curved portions and consequently are not mounted for pivotal movement as are the latter, as will hereinafter be described. However, in all other aspects they are constructed similarly to rolls 26 which will presently be described in detail.

Figure 4:
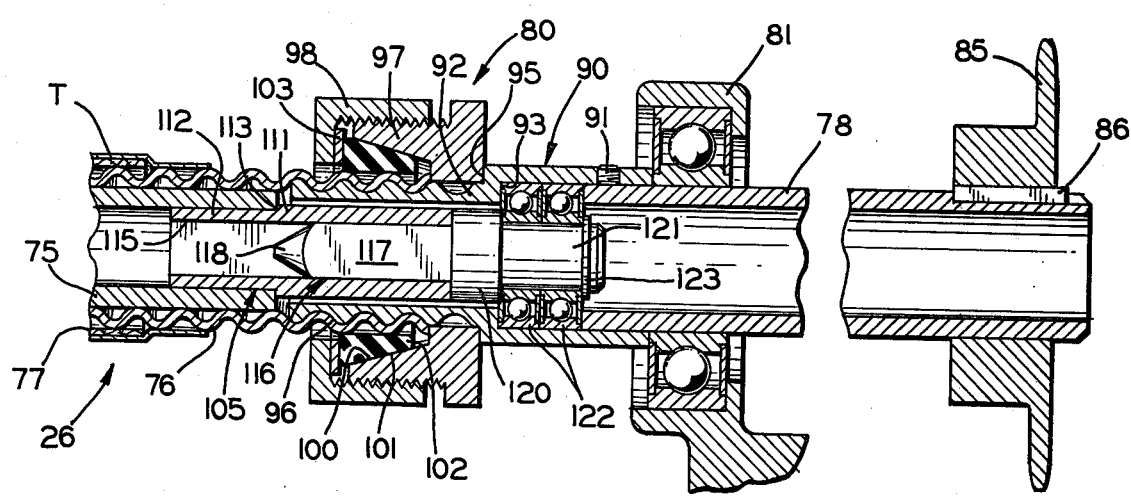
FIG. 4 is a vertical sectional view, on an enlarged scale, taken about line 4—4 of FIG. 3, showing details of the coupling assembly of the present invention at the drive end of a conveyor roll.
Figure 5:
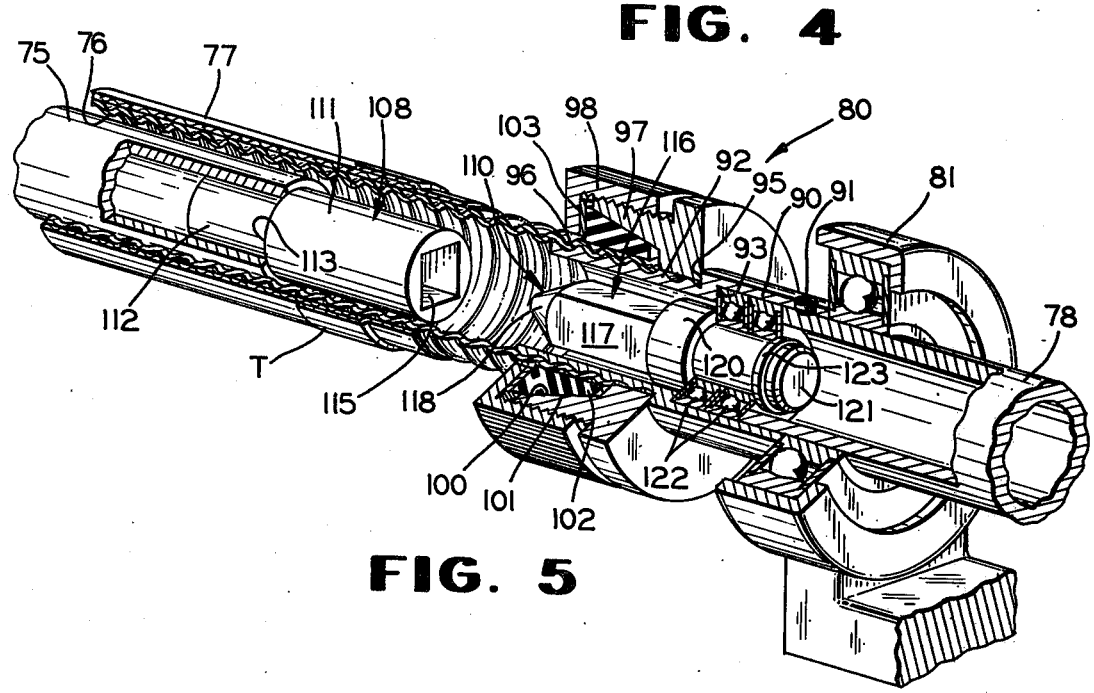
FIG. 5 is a perspective sectional view, showing the coupling assembly of this invention in an uncoupled, disengaged position.

Referring to FIGS. 4 and 5, each conveyor roll 26 comprises an inner, hollow, flexible, substantially stationary core member 75 and an outer, flexible, load carrying, rotatable sleeve 76. To facilitate rotation of the outer sleeve 76 about core 75, the former may be comprised of a convoluted liner formed of a suitable anti-friction material, such as fluorocarbon resin for example, covered with a layer of stainless steel mesh to reinforce the same and prevent kinking thereof. While the outer sleeve 76 is flexible for conforming to the arcuate shape of the inner core 75, it is capable of transmitting torque without significant axial twist or distortion. The sleeve 76 can be covered with an asbestos or fiberglass material 77 to provide a resiliently yieldable, heat resistant, non-marring surface upon which the glass sheets are received. The covering 77 is secured by stretching it over the sleeve 76 and fastening the ends thereto with pressure sensitive tape T or in some other suitable manner.

One end of the outer sleeve member 76 of each conveyor roll 26 is coupled to a rotatable tubular drive member 78 for rotation therewith by a coupling, generally designated 80. The drive member 78 is journalled for rotation in spaced bearings 81 and 82 carried on a rail 83 extending along one side of the bending apparatus and is provided with a pinion 85 rigidly secured to drive member 78 by means of a key 86. An endless drive chain (not shown) is trained about the pinions of the several conveyor rolls 26, 26' for rotating the same in unison at the same rate of speed about their respective chordal axes. The other opposite ends of sleeve members 76 are left free, as shown at 87 in FIG. 3 for free rotation relative to their associated core member 75.

Each coupling 80 is mounted on a tubular drive extension 90, which forms a part of the coupling assembly of this invention as will hereinafter be more fully explained, and which is secured to drive member 78 as by suitable set screws 91 for rotation therewith. The tubular drive extension 90 is formed with a reduced diameter portion 92 defining inner and outer annular shoulders 93 and 95. The outer surface of the reduced diameter portion 92 is convoluted, as at 96, to receive the complementary shaped end portion of sleeve member 76. Coupling 80 also includes an externally threaded male member 97 seated against shoulder 95 and adapted to receive an internally threaded female connector member 98 disposed about the sleeve member 76 for attaching the latter to tubular extension 90.

The internal wall surface 100 of male member 97 is tapered inwardly to engage the outer, conically shaped, complemental surface 101 of a gripping sleeve 102 having a bore for receiving the sleeve member 76 therethrough. The gripping sleeve 102 is formed of rubber or any other suitable resiliently yieldable, elastomeric material and when compressed radially, exerts a radial clamping force on the sleeve member 76. The rear end of gripping sleeve 102 is flat and bears against a washer 103 interposed between gripping sleeve 102 and the rear end wall of female connector member 98.

Figure 6:
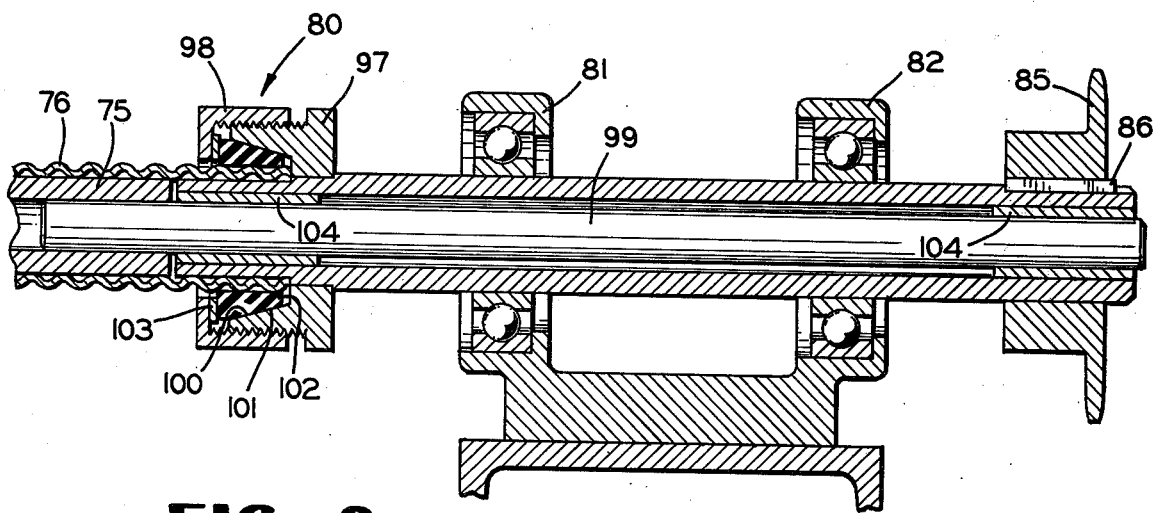
FIG. 6 is a vertical sectional view of a prior art composite roll construction.

Except for tubular extension 90, the roll construction so far described, as well as coupling 80, is conventional and is shown in the prior art construction depicted in FIG. 6, wherein the same reference characters denote like parts. However, in the prior art construction depicted in FIG. 6, the coupling 80 is mounted directly on the tubular drive member, identified by numeral 78'. Also, a stub shaft 99 extends axially through the drive member 78' and is rigidly secured at its inner end within the roll core member 75, forming an integral part thereof. A pair of axially spaced sleeve bushings 104 are interposed between the stub shaft 99 and drive member 78' to facilitate rotation of the latter relative to stub shaft 99.

It should be noted that each time a production run of differently configurated glass sheets is contemplated, a corresponding change in the curvature of conveyor rolls 26 is required. However, rather than replace the entire composite roll, it is only necessary to replace the core of the roll with a differently curved core since the flexible sleeve will assume the overall shape of the core.

In replacing a core member, the customary procedure is to uncouple the idle end thereof so that the core member can be withdrawn axially from within its associated sleeve. In the prior art roll constructions, the stub shaft 99, which is affixed to the core member, also is withdrawn from within the bushings 104 located in the drive member 78'. Problems were encountered in inserting a fresh core member into the sleeve because of the difficulty in properly aligning and then accurately inserting the stub shaft 99 within bushings 104 without disturbing or damaging the latter. Even slight damage or wear of these bushings can cause erratic and unbalanced rotation of the associated rolls. Often, one of the bushings would be completely dislodged from within the drive member while attempting to insert the stub shaft of a fresh core member therethrough, further compounding an adverse condition.

In order to avoid the above noted shortcomings of these prior art roll constructions and to facilitate conveyor roll core removal and replacement, each core member 75 adjacent the drive end of the conveyor roll 26 is provided with a quick connect-disconnect coupling assembly, generally designated 105 (FIGS. 4 and 5), constructed in accordance with this invention and which will presently be described in detail. The other end of each core member 75 is detachably connected to a stub shaft 106 by means of a coupling 107 (FIG. 1) of conventional construction. Since coupling 107 is conventional and, per se, forms no part of the present invention, it is believed that no further description or amplification thereof is necessary.

As shown in FIGS. 4 and 5, coupling assembly 105 of this invention includes the tubular drive extension 90 which serves as a casing or housing for a composite two-piece assembly including a first coupling section 108 secured to one end of each inner core member 75 and a second coupling section 110 mounted within the tubular drive extension 90 which rotates relative to the coupling section 110. Coupling section 108 comprises a cylindrical body 111 having a reduced diameter portion 112 separated by an annular shoulder 113. This reduced diameter portion 112 is press fitted or otherwise fixedly secured within the bore of core member 75 with shoulder 113 abutting against the end face of core member 75. Coupling section 108 is provided with a socket in the form of a bore 115 of square or flat sided configuration extending therethrough for receiving a complementary shaped male member of the other section 110, as will presently become apparent.

Coupling section 110 comprises an elongated body 116 mounted in the tubular drive extension 90 and includes a flat sided lug 117 of substantially square cross sectional configuration adapted to fit into the complementary shaped socket or bore 115 of coupling section 108. The forward end of lug 117 is tapered, as shown at 118, to facilitate insertion thereof into the socket 115. The body 116 is provided with a cylindrical flange 120 having the same outside dimension as the cylindrical body 111 of coupling section 108 and adapted to abut against the end face thereof when lug 117 is fully inserted into the socket 115.

The rearward end of elongated body 116 is reduced in diameter, as shown at 121, for receiving a pair of abutting bearings 122 thereon to permit rotary movement of the tubular drive extension 90 relative to coupling section 110. A suitable retaining ring 123 disposed about the reduced diameter portion 121 holds the bearings 122 in place in an abutting relation against flange 120. The bearings also are fixed in position between annular shoulder 93 and the end face of drive member 78.

In addition to rotation about their own chordal axes, the rolls 26 are mounted for pivotal movement in unison between a first position in which the curved central portions 73 thereof lie in a common horizontal plane as shown in FIG. 3 and a second or lower position in which these curved portions 73 are disposed in attitudes extending at angles to said common horizontal plane for conjointly defining a curved supporting surface complementary to the curvature imparted to the glass sheet. To this end, means are provided for shifting the rolls 26 between the two positions mentioned above, such means comprising a coupling 128 associated with each roll 26 for connecting the stub shaft 106 to a drive means 130. The stub shaft 106 is journalled for rotation in spaced bearings 125 and 126 mounted on a rail 127 extending along the other side of the bending section 16.

The drive means 130 for imparting rotary motion to the rolls 26 via coupling 128 includes a pinion gear 131 welded or otherwise fixedly secured about each coupling 128 and provided with peripheral teeth 132 engaging and meshing with a gear rack 133 secured to the upper face of a slide 135. The slide 135 is guided for axial sliding movement in a guide block 136 suitably affixed to the horizontally extending leg of an angle member 137 bolted on one leg 138 (FIG. 2) of the structural member forming rail 127.

The means for actuating slide 135, and thereby gear rack 133, includes a fluid cylinder 140 (FIGS. 2 and 3) pivotably mounted at its head end to a lug 141 affixed to a bracket 142 secured to the horizontal leg of an angle member 143 attached, as by means of fasteners 145, along its vertical leg to the rail 127. Cylinder 140 is provided with the usual reciprocal piston (not shown) connected to a piston rod 146, in turn connected to the slide 135. Retraction of the piston rod 146 effects axial movement of the slide 135 and gear rack 133 toward the left, as viewed in FIG. 2, to rotate the several gears 131 in unison in a clockwise direction for shifting the central portions 73 of rolls 26 from their upper horizontal dispositions to their lower angular attitudes. For a more detailed description and illustration of the roll shifting means described above, reference may be had to U.S. Pat. No. 4,015,968, assigned to the same assignee as the present invention.

The straight conveyor rolls 26' located exteriorly of the shaping rail 61 are not connected to the drive means 130. However, they are of an inner core-outer rotatable sleeve construction and are provided with the quick connect-disconnect coupling 105 of this invention.

In operation, the drive member 78 is coupled via tubular drive extension 90 and coupling 80, to the rotatable sleeve 76 of each conveyor roll 26, 26' for transmitting rotary motion to the latter relative to its respective core member 75. The core member, in turn, is connected at its opposite ends to tubular drive extension 90 and stub shaft 106 by the quick connect-disconnect coupling 105 of this invention and by the conventional coupling 107, respectively. When it is desired or required to change the curvature of rolls 26, such as would be occasioned by a change in the configuration of the glass sheets being bent, the hold down bolts (not shown) fastening bearing blocks 125 and 126 to rail 127 at the idle end of the roll are removed so that the stub shaft 106 along with these bearing blocks 125 and 126 can be lifted slightly, disengaging the associated pinion gear 131 from gear rack 132 allowing the stub shaft to be withdrawn axially away and uncoupled from the roll core member 75 at coupling 107. The core member 75 is then pulled axially away from the drive end of the roll to disengage coupling section 108 from coupling section 110 and withdraw core member 75 from within sleeve 76, which remains intact in its original position. Thus, the sleeve 76 remains coupled to the tubular drive extension 90 and coupling section 110 stays fixedly secured within the extension 90, without in any way disturbing the bearings associated therewith. Upon removal, a fresh conveyor roll core member can be expeditiously inserted in place by reversing the above-described steps.

From the foregoing, it is apparent that the objects of the invention have been fully accomplished. A new and useful quick connect-disconnect coupling assembly has been provided for quickly and easily replacing a conveyor roll core member of the inner core-outer sleeve type without disturbing the mounting of the conveyor roll sleeve or its coupled relation to the drive train. Moreover, the removal of roll components from within bushings or the like is eliminated, thereby avoiding consequent damage thereto and prolonging the useful life of the roll. While the coupling assembly of this invention is particularly suited for use with composite rolls of the fixed inner core-rotatable outer sleeve type herein described, it should be understood that the subject coupling is not in any way restricted in use with such composite type conveyor rolls, but has utility in a wide variety of conveyor roll or rotatable member applications, as desired.

It is to be understood that the form of the invention herewith shown and described is to be taken as an illustrative embodiment of the same, and that various changes in the shape, size and arrangement of parts may be resorted to without departing from the spirit of the invention.

I claim:

1. In apparatus for supporting and conveying glass sheets including a plurality of conveyor rolls each comprising an inner core member and an outer load supporting sleeve, means including a tubular drive member for rotating said sleeve about said inner core member, and means connecting said tubular drive member to one end of each inner core member for rotation thereof relative to said core member: the improvement wherein said connecting means comprises a tubular extension affixed to said drive member for rotation therewith and a coupling having a first section secured to one end of said inner core member and a second section mounted within said tubular extension, and means detachably connecting said first and second coupling sections together.

2. An apparatus according to claim 1, wherein said detachably connecting means comprises a socket in said first coupling section and a lug formed on said second coupling section insertable in said socket.

3. An apparatus according to claim 2, wherein said socket and lug have complimentary shaped flat sides, respectively, allowing axial movement but preventing relative rotation therebetween.

4. An apparatus according to claim 1, wherein said first coupling section is formed with a cylindrical body having a reduced diameter portion fitted within said one end of said inner core member and rigidly secured therein.

5. An apparatus according to claim 1, wherein said second coupling section comprises an elongated body having a reduced diameter portion mounted within bearings seated in said tubular extension.

6. An apparatus according to claim 5, wherein said elongated body is formed with a cylindrical flange intermediate the opposite ends thereof and a lug extending axially from said flange and insertable into a socket formed in said first coupling section.

7. An apparatus according to claim 1, wherein said first coupling section is formed with a cylindrical body having a reduced diameter portion fitted within said one end of said inner core member and rigidly secured therein, said second coupling section comprises an elongated body having a cylindrical flange intermediate the opposite ends thereof and a reduced diameter portion projecting axially in one direction from said flange and mounted within bearings seated in said tubular extension, and said detachably connecting means comprises a socket formed in said cylindrical body of said first coupling section and a lug formed on said second coupling section and extending axially from said flange in a direction opposite to said second coupling reduced diameter portion and insertable into said socket.

* * * * *

UNITED STATES PATENT AND TRADEMARK OFFICE
CERTIFICATE OF CORRECTION

PATENT NO. : 4,167,997
DATED : September 18, 1979
INVENTOR(S) : Robert G. Revells It is certified that error appears in the above–identified patent and that said Letters Patent are hereby corrected as shown below:

Col. 3, line 68, "solid-line" should be --solid-type--

Signed and Sealed this

Eighteenth Day of December 1979

[SEAL]

Attest:

SIDNEY A. DIAMOND

Attesting Officer

Commissioner of Patents and Trademarks